US010655260B2

(12) United States Patent
Maki

(10) Patent No.: US 10,655,260 B2
(45) Date of Patent: May 19, 2020

(54) NON-TRANSITORY COMPUTER-READABLE MEDIUM AND SEWING DATA GENERATION DEVICE

(71) Applicant: BROTHER KOGYO KABUSHIKI KAISHA, Nagoya-shi, Aichi-ken (JP)

(72) Inventor: Ryutaro Maki, Handa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 16 days.

(21) Appl. No.: 16/053,319

(22) Filed: Aug. 2, 2018

(65) Prior Publication Data
US 2018/0340280 A1 Nov. 29, 2018

Related U.S. Application Data

(63) Continuation of application No. PCT/JP2017/000993, filed on Jan. 13, 2017.

(30) Foreign Application Priority Data

Feb. 29, 2016 (JP) .................. 2016-036627

(51) Int. Cl.
*D05C 5/02* (2006.01)
*D05B 19/08* (2006.01)
(Continued)

(52) U.S. Cl.
CPC ............ *D05C 5/02* (2013.01); *D05B 19/08* (2013.01); *G05B 15/02* (2013.01); *D05C 3/02* (2013.01);
(Continued)

(58) Field of Classification Search
CPC . D05C 5/00; D05C 5/02; D05B 19/08; D05B 19/10; D05B 19/12
See application file for complete search history.

(56) References Cited

U.S. PATENT DOCUMENTS 5,231,586 A 7/1993 Shimizu
5,299,514 A * 4/1994 Hayakawa ............ D05B 21/00
112/102.5
(Continued)

FOREIGN PATENT DOCUMENTS

JP H04-017888 A 1/1992
JP H6-306759 A 11/1994
JP 2005-211206 A 8/2005

OTHER PUBLICATIONS

Apr. 18, 2017 International Search Report issued in International Patent Application PCT/JP2017/000993.
(Continued)

*Primary Examiner* — Nathan E Durham
(74) *Attorney, Agent, or Firm* — Oliff PLC

(57) ABSTRACT

A non-transitory computer-readable medium stores computer-readable instructions. The instructions, when executed, cause a processor of a sewing data generation device configured to generate sewing data to perform processes. The processes include acquiring pattern data to sew an embroidery pattern. The processes further include setting an outline having an offset portion and a complementary portion on the basis of the pattern data. The outline is a single line surrounding the outside of a contour of the embroidery pattern. The offset portion is a part of the single line and is offset from the contour toward the outside of the embroidery pattern by a predetermined amount. The complementary portion is another part of the single line and being offset from the contour toward the outside of the embroidery pattern by an amount larger than the predetermined amount. The processes also include generating sewing data to sew the outline.

19 Claims, 7 Drawing Sheets

(51) Int. Cl.
　　　 *G05B 15/02*　　　(2006.01)
　　　 *D05C 3/02*　　　　(2006.01)
　　　 *D05C 9/04*　　　　(2006.01)

(52) U.S. Cl.
　　　 CPC ............ *D05C 9/04* (2013.01); *D05D 2205/02*
　　　　　　　　　　　　(2013.01); *D05D 2205/18* (2013.01)

(56) References Cited

U.S. PATENT DOCUMENTS

| | | | |
|---|---|---|---|
| 5,438,520 A | 8/1995 | Satoh et al. | |
| 5,740,055 A * | 4/1998 | Iwata .................... | D05B 19/08 112/475.19 |
| 6,301,518 B1 * | 10/2001 | Kawaguchi ............ | G06T 11/60 700/131 |
| 6,963,790 B2 * | 11/2005 | Mizuno ................. | D05B 19/08 112/102.5 |
| 2005/0165506 A1 | 7/2005 | Mizuno et al. | |
| 2014/0083345 A1 * | 3/2014 | Tokura .................. | D05B 19/08 112/470.01 |
| 2016/0031108 A1 * | 2/2016 | Bailie ................... | B26D 5/005 700/134 |
| 2019/0292700 A1 * | 9/2019 | Bailie ................... | D05B 19/08 |

OTHER PUBLICATIONS

"NEW! Patch Wizard" (http://www.brother-usa.com/homesewing/embroiderysoftware/pedesign/ped10.aspx#. Vm5gT5WeGg); Dec. 14, 2015.
Sep. 4, 2018 International Preliminary Report on Patentability issued in International Patent Application No. PCT/JP2017/000993.

* cited by examiner

FIG. 3
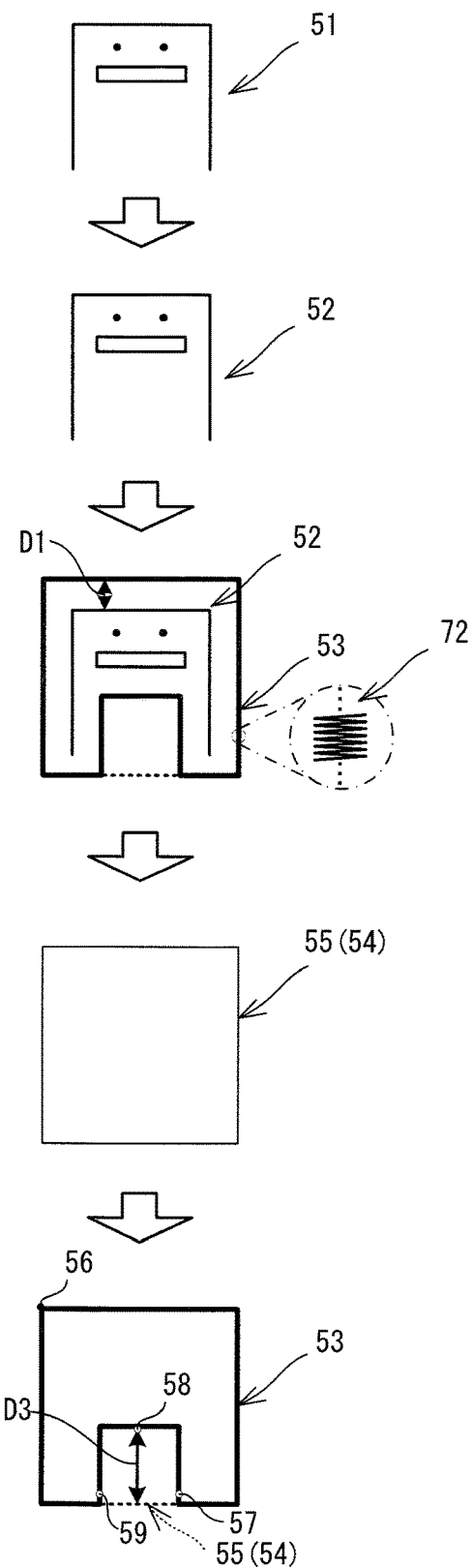
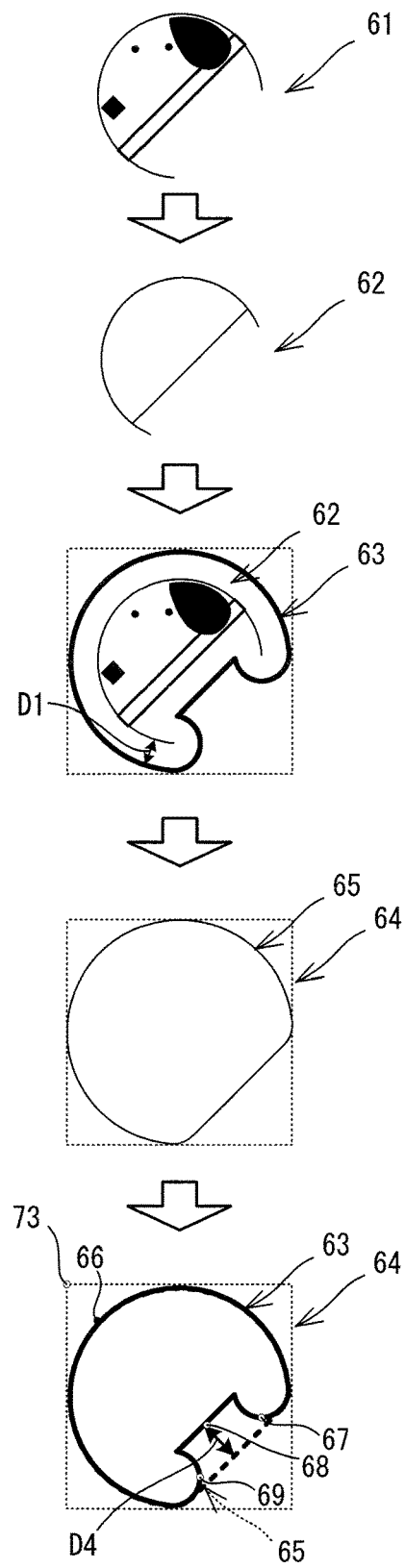

NON-TRANSITORY COMPUTER-READABLE MEDIUM AND SEWING DATA GENERATION DEVICE

CROSS-REFERENCE TO RELATED APPLICATION

This application is a continuation application of International Application No. PCT/JP2017/000993, filed on Jan. 13, 2017, which claims priority from Japanese Patent Application No. 2016-36627, filed on Feb. 29, 2016. The disclosure of the foregoing application is hereby incorporated by reference in its entirety.

BACKGROUND

The present disclosure relates to a non-transitory computer-readable medium and a sewing data generation device that generate sewing data to sew an embroidery pattern using a sewing machine capable of embroidery sewing.

In related art, a device is known that can generate sewing data to form stitches along a contour line. In the known device, when a piece of applique fabric is sewn on a sewing object, the sewing data is created to form stitches on an offset line that is inside the contour line of the piece of applique fabric.

SUMMARY

Sewing data to form stitches on an outline that is set outside a contour line of an embroidery pattern has not been sufficiently considered.

Various embodiments of the broad principles derived herein provide a non-transitory computer-readable medium and a sewing data generation device that are capable of appropriately setting an outline that is set outside a contour line of an embroidery pattern, in accordance with a shape of the embroidery pattern.

Embodiments herein provide a non-transitory computer-readable medium that stores computer-readable instructions. The instructions, when executed, cause a processor of a sewing data generation device configured to generate sewing data to perform processes. The processes include acquiring pattern data to sew an embroidery pattern. The processes further include setting an outline having an offset portion and a complementary portion on the basis of the pattern data. The outline is a single line surrounding the outside of a contour of the embroidery pattern. The offset portion is a part of the single line and is offset from the contour toward the outside of the embroidery pattern by a predetermined amount. The complementary portion is another part of the single line and being offset from the contour toward the outside of the embroidery pattern by an amount larger than the predetermined amount. The processes also include generating sewing data to sew the outline.

Embodiments herein further provide a sewing data generation device that includes a processor and a memory. The memory is configured to store computer-readable instructions that, when executed by the processor, instruct the processor to perform processes. The processes include acquiring pattern data to sew an embroidery pattern. The processes further include setting an outline having an offset portion and a complementary portion on the basis of the pattern data. The outline is a single line surrounding the outside of a contour of the embroidery pattern. The offset portion is a part of the single line and is offset from the contour toward the outside of the embroidery pattern by a predetermined amount. The complementary portion is another part of the single line and being offset from the contour toward the outside of the embroidery pattern by an amount larger than the predetermined amount. The processes also include generating sewing data to sew the outline.

BRIEF DESCRIPTION OF THE DRAWINGS

Embodiments will be described below in detail with reference to the accompanying drawings in which:

FIG. 3 is an explanatory diagram of a process in which an outline is set for each of an embroidery pattern of a first example and an embroidery pattern of a second example;

DETAILED DESCRIPTION

Figure 1:
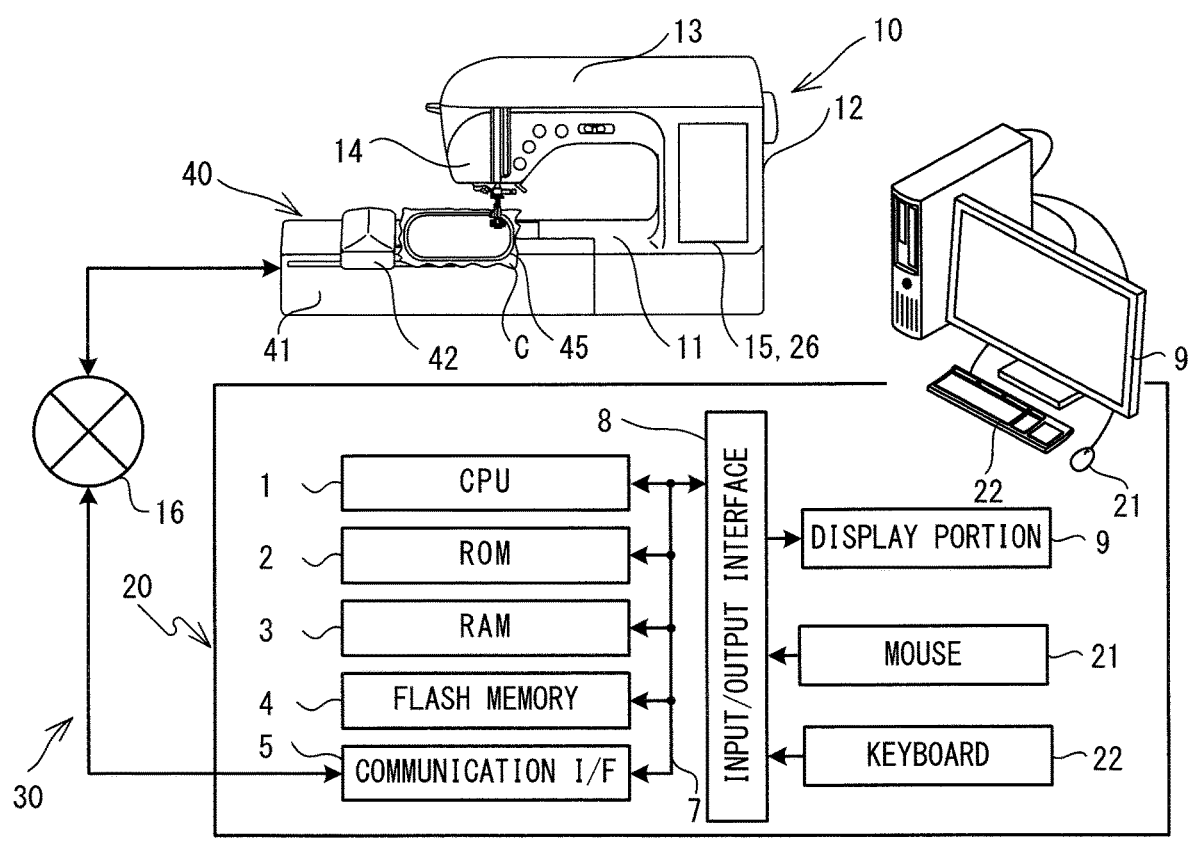
FIG. 1 is a schematic diagram of a sewing system including a sewing machine and a sewing data generation device.

A first embodiment and a second embodiment of the present disclosure will be explained sequentially with reference to the drawings. A sewing system 30 that is common to the first embodiment and the second embodiment will be explained with reference to FIG. 1. As shown in FIG. 1, the sewing system 30 is provided with a sewing machine 10 and a sewing data generation device 20 (hereinafter referred to as the "device 20"). The sewing machine 10 is capable of embroidery sewing. The device 20 is a well-known personal computer (PC), and is provided with a display portion 9, a mouse 21 and a keyboard 22.

1. Physical Configurations of Sewing Machine 10 and Embroidery Frame 45

As shown in FIG. 1, the sewing machine 10 is provided with a bed portion 11, a pillar 12, an arm portion 13, a head portion 14, and a movement mechanism 40. The bed portion 11 is a base portion of the sewing machine 10 and extends in the left-right direction. The pillar 12 is provided so as to extend upward from the right end portion of the bed portion 11. An LCD 15 and a touch panel 26 are provided on the front surface of the pillar 12. The arm portion 13 faces the bed portion 11 and extends to the left from the upper end of the pillar 12. The head portion 14 is a portion coupled to the left leading end portion of the arm portion 13. Although not shown in the drawings, the head portion 14 is provided with a needle bar, a presser bar, a needle bar up-and-down movement mechanism and the like. A sewing needle is detachably mounted on the lower end of the needle bar.

The movement mechanism 40 is configured to relatively move a sewing object C, which is held by the embroidery frame 45, with respect to the needle bar. The movement mechanism 40 is provided with a main body case 41 and a carriage 42. When embroidery sewing is performed, a user mounts the embroidery frame 45 on the carriage 42. The embroidery frame 45 is moved to a needle drop point indicated by an XY coordinate system (an embroidery coordinate system) specific to the sewing machine 10, by a Y direction movement mechanism (not shown in the drawings) housed in the carriage 42 and an X direction movement mechanism (not shown in the drawings) housed in the main body case 41. The needle bar on which the sewing needle has been mounted and a shuttle mechanism (not shown in the drawings) are driven in accordance with the movement of the embroidery frame 45. Thus, an embroidery pattern is sewn on the sewing object C.

2. Electrical Configuration of Device 20

As shown in FIG. 1, the device 20 is provided with a CPU 1, a ROM 2, a RAM 3, a flash memory 4, a communication I/F 5 and an input/output interface 8. The CPU 1 performs overall control of the device 20. The CPU 1 is electrically connected to the ROM 2, the RAM 3, the flash memory 4, the communication I/F 5 and the input/output interface 8, via a bus 7. A boot program and a BIOS and the like are stored in the ROM 2. Temporary data may be stored in the RAM 3. Various setting values including a marker storage area 49, which will be described later with reference to FIG. 2, may be stored in the flash memory 4. The communication I/F 5 is an interface to connect the device 20 to the network 16. The CPU 1 can transmit and receive data to and from other devices (for example, the sewing machine 10) connected to the network 16, via the communication I/F 5. The input/output interface 8 is connected to the display portion 9, the mouse 21 and the keyboard 22. The display portion 9 is a liquid crystal display. The mouse 21 and the keyboard 22 may be used to input various commands.

3. Brief Overview of Processing Performed by Device 20

A brief overview of processing that is performed by the device 20 will be explained. In main processing of the device 20, on the basis of pattern data used to sew an embroidery pattern selected by the user, processing is performed to generate sewing data used to sew an outline on the outside of the contour of the embroidery pattern. When the contour of the embroidery pattern is represented by a closed polygon or a closed circular graphic, such as a circle, an ellipse or the like, an area surrounded by the contour is the inside of the embroidery pattern. In this case, the outside of the embroidery pattern is a side opposite to the inside of the embroidery pattern with respect to the contour. When the contour of the embroidery pattern is not represented by the closed circular graphic, with respect to the contour, the center side of a smallest rectangle (a mask area) that encompasses the embroidery pattern is the inside of the embroidery pattern, and a side opposite to the center of the smallest rectangle with respect to the contour is the outside of the embroidery pattern. The CPU 1 of the device 20 acquires the pattern data used to sew the embroidery pattern. The pattern data is data indicating coordinates of needle drop points to form stitches that form a pattern, a sewing order, and a color of a thread to be used. The coordinates of the needle drop points are represented by the aforementioned embroidery coordinate system. On the basis of the acquired pattern data, the device 20 sets an outline including an offset portion and a complementary portion. The outline is a pattern represented by a single line that surrounds the outside of the embroidery pattern and that has a predetermined thickness. The offset portion is a part of the single line representing the outline, and is a portion that is offset from the contour of the embroidery pattern by a first predetermined amount toward the outside of the embroidery pattern.

The complementary portion is a pattern represented by a single line that surrounds the outside of the embroidery pattern and that has a predetermined thickness. The complementary portion is another part of the single line representing the outline, and is a portion that is offset from the contour of the embroidery pattern, by an amount larger than the first predetermined amount, toward the outside of the embroidery pattern. For example, when an emblem and an applique are created on the basis of the embroidery pattern, the outline is sewn on the outside of the embroidery pattern, as a pattern that surrounds the embroidery pattern.

4. Main Processing of First Embodiment

The main processing of the device 20 of the first embodiment will be explained with reference to FIG. 2 to FIG. 6. The main processing is performed when the user inputs a command to select an embroidery pattern to be sewn and thereafter inputs a command to set the outline for the selected embroidery pattern. The embroidery pattern to be sewn is selected from among a plurality of patterns stored in the flash memory 4, for example. When the CPU 1 of the device 20 detects the command, the CPU 1 reads out, to the RAM 3, a sewing data generation program to perform the main processing stored in a program storage area of the ROM 2. In accordance with instructions included in the sewing data generation program read out to the RAM 3, the CPU 1 performs the following steps. Various parameters that are necessary to perform the main processing are stored in the flash memory 4. Various data obtained in the course of the main processing are stored in the RAM 3, as appropriate. Hereinafter, as the first example, a case will be explained in which an embroidery pattern 51 (refer to FIG. 3) stored in the flash memory 4 is selected as the pattern to be sewn. The first example is a pattern representing a character having eyes and a mouth. As the second example, a case will be explained in which an embroidery pattern 61 (refer to FIG. 3) stored in the flash memory 4 is selected as the pattern to be sewn. The second example is a pattern representing a character that is a dog. The processing relating to the first example and the processing relating to the second example are performed separately at timings that are different from each other. However, in order to simplify the explanation, the processing relating to the first example and the processing relating to the second example will be explained in parallel.

Figure 2:
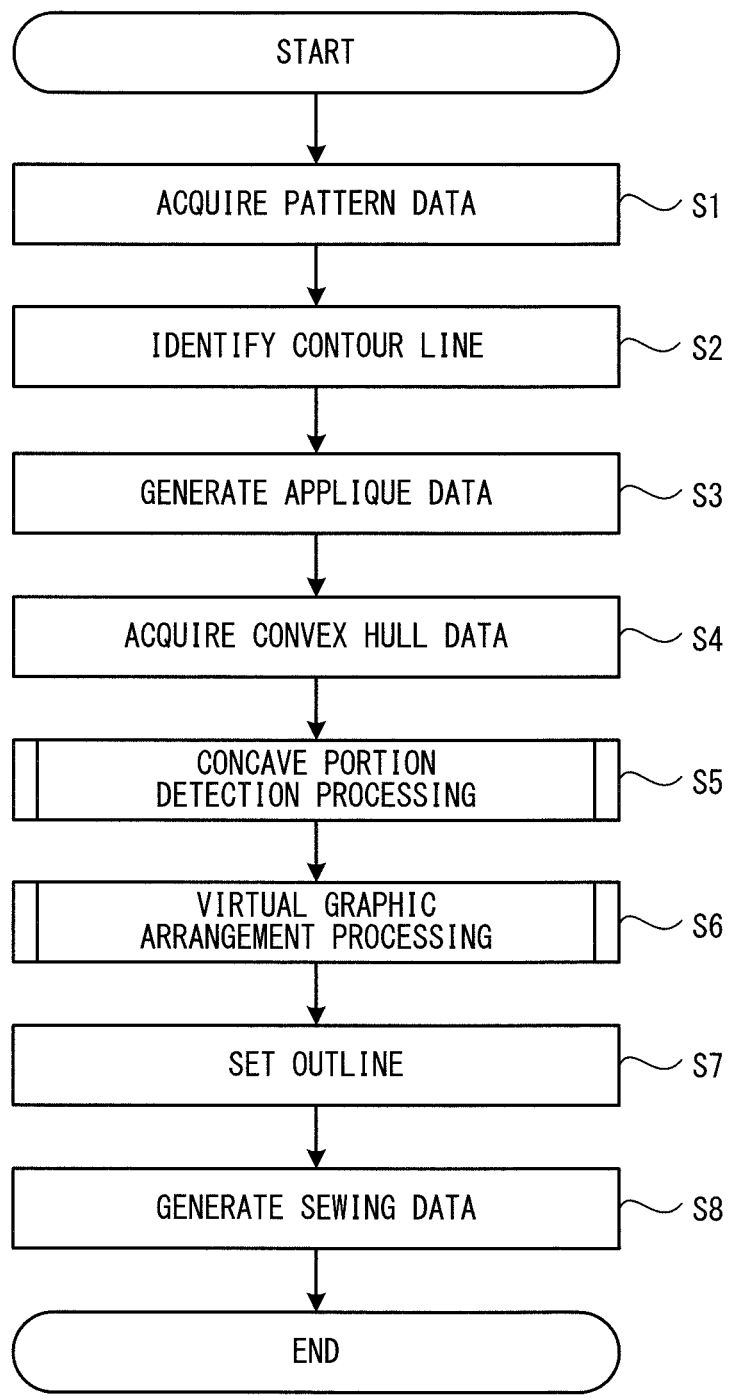
FIG. 2 is a flowchart of main processing according to a first embodiment performed by the sewing data generation device.

As shown in FIG. 2, the CPU 1 acquires the pattern data of the embroidery pattern selected by the user from the flash memory 4 (step S1). In the first example, the pattern data of the embroidery pattern 51 is acquired. In the second example, the pattern data of the embroidery pattern 61 is acquired. The CPU 1 identifies the contour line of the embroidery pattern on the basis of the pattern data acquired at step S1 (step S2). The processing to identify the contour line on the basis of the pattern data is well known, and thus a detailed explanation thereof will be omitted. In the first example, a contour line 52 is identified. In the second example, a contour line 62 is identified.

The CPU 1 generates applique data on the basis of the contour line identified at step S2 (step S3). The applique data is the pattern data to sew a pattern (hereinafter referred to as an applique pattern) representing a line that has a predetermined thickness and that is offset from the contour line identified at step S2 toward the outside of the embroidery pattern by a first predetermined amount D1. The first predetermined amount D1 may be set in advance and is 3 mm, for example. The predetermined thickness may be set in advance and is 3 mm, for example. The first predetermined amount D1 and the predetermined thickness may be set by the user, or may be set by the CPU 1 to a value that accords with a type, a size, a shape and the like of the embroidery pattern. In the first example, the applique data to sew an applique pattern 53 is generated. The applique data represents positions of the needle drop points of stitches representing the applique pattern, such as stitches of zigzag stitching shown by stitches 72, for example. In the second example, the applique data to sew an applique pattern 63 is generated.

The CPU 1 acquires convex hull data of the needle drop points represented by the applique data generated at step S3 (step S4). The convex hull data is data representing vertices of a minimum convex polygon that encompasses all the needle drop points represented by the applique data. The convex polygon represented by the convex hull data is also referred to as a convex hull graphic. Examples of a method for acquiring the convex hull data include an incremental method, a divide-and-conquer method, a prune-and-search method, Graham's scan, Jarvis's march, and the like. These methods are well known and thus a detailed explanation thereof will be omitted here. In the first example, the convex hull data representing a convex hull graphic 55 is acquired. In the first example, the convex hull graphic 55 is the same as a graphic representing a mask area 54 of the applique pattern 53. The mask area is a smallest rectangle that encompasses the pattern. Two sides of the mask area are parallel to an X axis of the embroidery coordinate system. The other two sides of the mask area are parallel to a Y axis of the embroidery coordinate system. In the second example, the convex hull data representing a convex hull graphic 65 is acquired. In the second example, the convex hull graphic 65 is different from a graphic representing a mask area 64 of the applique pattern 63.

The CPU 1 performs concave portion detection processing (step S5). The concave portion detection processing is processing to detect a concave portion that is recessed, by a predetermined amount or more, from the applique pattern represented by the applique data generated at step S3 toward the embroidery pattern side. The CPU 1 of the present embodiment detects the concave portion using the convex hull data acquired at step S4. Specifically, the needle drop points represented by the applique data are acquired in a clockwise direction, from a reference point taken as a start point. The reference point may be a point determined in advance, and in the present embodiment, the reference point is a point closest to a specific vertex (an upper left point of the mask area shown in FIG. 3) of the mask area of the applique pattern. In order to simplify the explanation, in the present embodiment, it is assumed that the reference point is not a point included in the concave portion of the applique pattern. The CPU 1 detects, as the concave portion of the applique pattern, a portion for which a distance from each of the needle drop points represented by the applique data to the convex hull graphic represented by the convex hull data is equal to or more than a threshold value. The concave portion of the applique pattern has a shape corresponding to the contour line of the embroidery pattern. Therefore, the concave portion of the applique pattern corresponds to a concave portion of the graphic represented by the contour line of the embroidery pattern.

Figure 4:
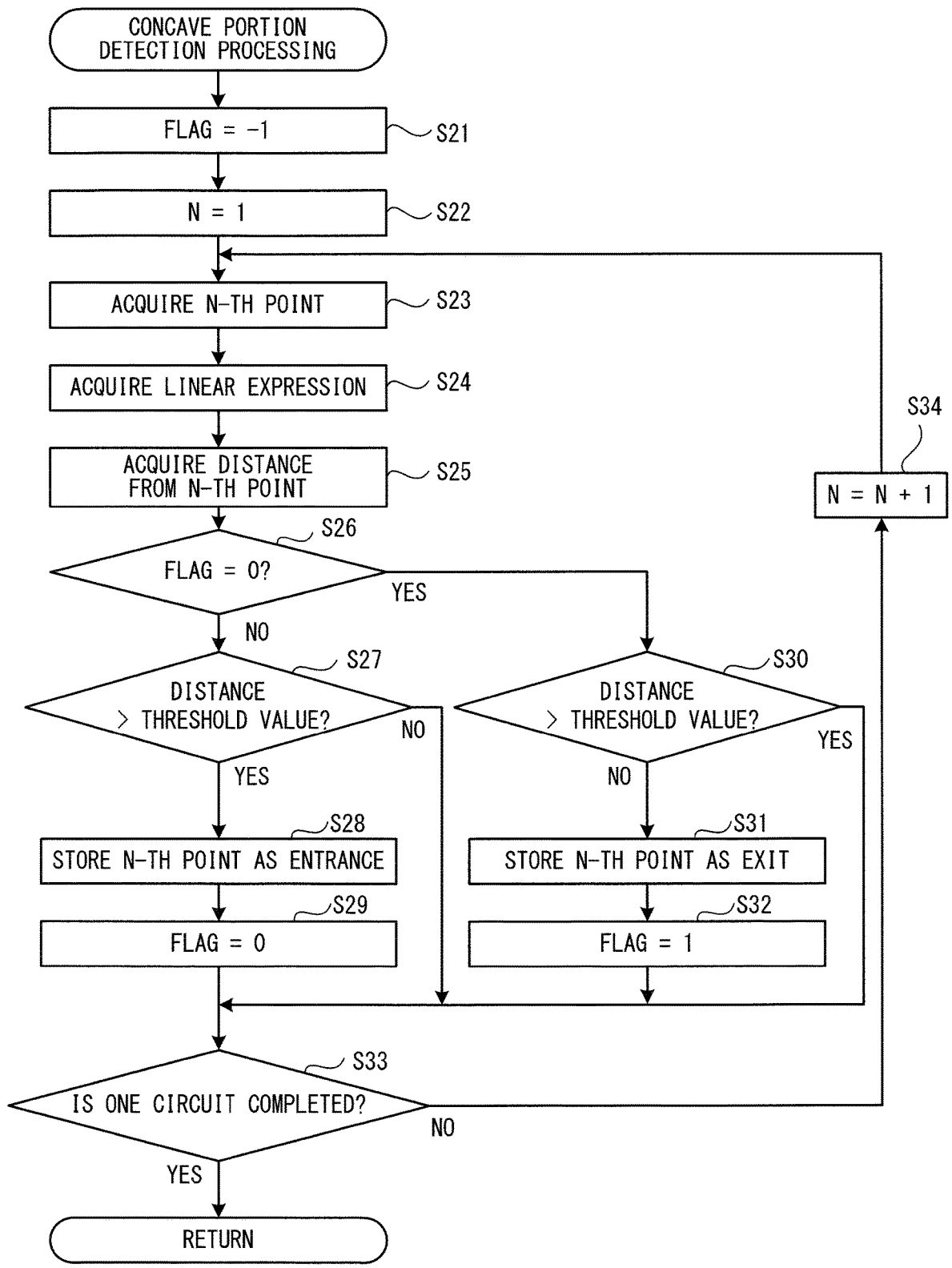
FIG. 4 is a flowchart of concave portion detection processing that is performed in the main processing shown in FIG. 2.

As shown in FIG. 4, in the concave portion detection processing, first, the CPU 1 sets a flag to −1 (step S21). The flag is set to one of the values −1, 0, and 1, and indicates a detection status of the concave portion. When the flag is set to −1, this indicates that the needle drop point for which the distance from the needle drop point to the convex hull graphic is equal to or more than the threshold value has not been detected in the concave portion detection processing. When the flag is set to 0, this indicates a state in which, although an entrance of the concave portion has been detected, an exit of the concave portion has not been detected. When the flag is set to 1, this indicates a state in which the exit of the concave portion has been detected after the entrance of the concave portion has been detected. When the needle drop points represented by the applique data are sequentially acquired in the clockwise direction from the reference point, the entrance of the concave portion is a first point for which the distance from the needle drop point to the convex hull graphic is larger than the threshold value. When the needle drop points represented by the applique data are sequentially acquired in the clockwise direction from the reference point, the exit of the concave portion is a first point for which the distance from the needle drop point to the convex hull graphic is equal to or less than the threshold value, after the entrance has been detected. When the embroidery pattern is provided with a plurality of concave portions, the entrance and the exit are identified for each of the concave portions.

The CPU 1 sets a variable N to 1 (step S22). The variable N is a variable to read out the needle drop points representing the applique pattern in a predetermined order. The CPU 1 acquires coordinates of an N-th needle drop point indicated by the applique data (step S23). When the variable N is 1, the CPU 1 acquires the reference point from among the plurality of needle drop points indicated by the applique data. When the variable N is 1, in the first example, an upper left point 56 in FIG. 3 is acquired. In the second example, a point 66, which is closest to an upper left point 73 of the mask area 64, is acquired. The method for acquiring the reference point may be determined in advance and may be changed as appropriate.

The CPU 1 acquires a linear expression of the convex hull data corresponding to the N-th needle drop point acquired at step S23 (step S24). The linear expression of the convex hull data corresponding to the N-th needle drop point is used in the processing to acquire the distance from the N-th needle drop point to the convex hull graphic. A vertex of the convex hull graphic represented by the convex hull data is one of the plurality of needle drop points indicated by the applique data. The vertex of the convex hull graphic is, for example, an M-th needle drop point (M is a natural number) in an acquisition order. A side of the convex hull graphic represented by the convex hull data is represented by, for example, a line segment that connects the M-th needle drop point in the acquisition order and an L-th needle drop point (L is a natural number larger than M) in the acquisition order. The linear expression of the convex hull data corresponding to the N-th needle drop point is the linear expression that satisfies the condition that N is equal to or more than M and less than L, among the linear expressions representing the sides of the convex hull graphic.

The CPU 1 acquires the distance from the N-th needle drop point acquired by the processing at step S23 to the side of the convex hull graphic represented by the linear expression acquired by the processing at step S24 (step S25). When the variable N is 1, the distance 0 is acquired in each of the first example and the second example. The CPU 1 determines whether the flag is set to 0 (step S26). When the variable N is 1, the flag is set to −1 and the flag is not set to 0 (no at step S26). In this case, the CPU 1 determines whether the distance acquired at step S25 is larger than the threshold value (step S27). The threshold value is set in advance while taking account of a size of the embroidery pattern, and a first predetermined value and a predetermined thickness etc. of the applique pattern. For example, ten to twenty percent of the length of the short side of the rectangular mask area of the embroidery pattern is set as the threshold value. When the distance is larger than the threshold value (yes at step S27), the CPU 1 stores the N-th needle drop point acquired by the processing at step S23 as the entrance of the concave portion (step S28). The CPU 1 sets the flag to 0 (step S29). When the distance is not larger than the threshold value (no at step S27) or after the processing at step S29, the CPU 1 determines whether a full circuit of the plurality of needle drop points represented by the applique data has been acquired in the clockwise direction from the reference point (step S33). When one circuit is not completed (no at step S33), the CPU 1 increments the variable N by 1 (step S34) and returns the processing to step S23. When one circuit is completed (yes at step S33), the CPU 1 ends the concave portion detection processing and returns the processing to the main processing in FIG. 2.

In the first example, when a point 57 is acquired by the processing at step S23 that is repeatedly performed, it is determined that the distance calculated by the processing at step S25 is larger than the threshold value (yes at step S27). In this case, the CPU 1 stores the point 57 as the entrance of the concave portion (step S28) and sets the flag to 0 (step S29). In the first example, when a point 58 is acquired by the processing at step S23 that is repeatedly performed, it is determined that the flag has been set to 0 (yes at step S26), and then the CPU 1 determines whether or not a distance D3 acquired at step S25 is larger than the threshold value (step S30). When the distance is not larger than the threshold value (no at step S30), the CPU 1 stores the N-th needle drop point acquired by the processing at step S23 as the exit of the concave portion (step S31). The CPU 1 sets the flag to 1 (step S32) and performs the processing at step S33 in the same manner as described above. In the first example, it is determined that the distance D3 is larger than the threshold value (yes at step S30), and the CPU 1 performs the processing at step S33 in the same manner as described above. In the first example, when a point 59 is acquired by the processing at step S23 that is repeatedly performed, it is determined that the flag has been set to 0 (yes at step S26), and it is determined that the distance D3 is not larger than the threshold value (no at step S30). In this case, the CPU 1 stores the point 59 acquired by the processing at step S23 as the exit of the concave portion (step S31). The CPU 1 sets the flag to 1 (step S32) and performs the processing at step S33 in the same manner as described above.

In the second example, when a point 67 is acquired by the processing at step S23 that is repeatedly performed, it is determined that the distance calculated by the processing at step S25 is larger than the threshold value (yes at step S27). In this case, the CPU 1 stores the point 67 as the entrance of the concave portion (step S28) and sets the flag to 0 (step S29). When a point 68 is acquired by the processing at step S23 that is repeatedly performed, it is determined that the flag has been set to 0 (yes at step S26), and the CPU 1 determines that a distance D4 acquired at step S25 is larger than the threshold value (yes at step S30). When a point 69 is acquired by the processing at step S23 that is repeatedly performed, it is determined that the flag has been set to 0 (yes at step S26), and it is determined that the distance is not larger than the threshold value (no at step S30). In this case, the CPU 1 stores the point 69 acquired by the processing at step S23 as the exit of the concave portion (step S31). The CPU 1 sets the flag to 1 (step S32) and performs the processing at step S33 in the same manner as described above. When one circuit is completed (yes at step S33), the CPU 1 ends the concave portion detection processing and returns the processing to the main processing in FIG. 2.

As shown in FIG. 2, after the processing at step S5, the CPU 1 performs virtual graphic arrangement processing (step S6). The virtual graphic arrangement processing is processing to arrange a virtual graphic that includes at least a virtual line used to set the outline, in accordance with the arrangement of the applique pattern (the embroidery pattern). The virtual line is a line on the outside of the contour line with respect to the embroidery pattern. The CPU 1 of the present embodiment sets the offset portion on the basis of the applique pattern. The CPU 1 of the present embodiment sets the complementary portion on the basis of the virtual graphic.

Figure 5:
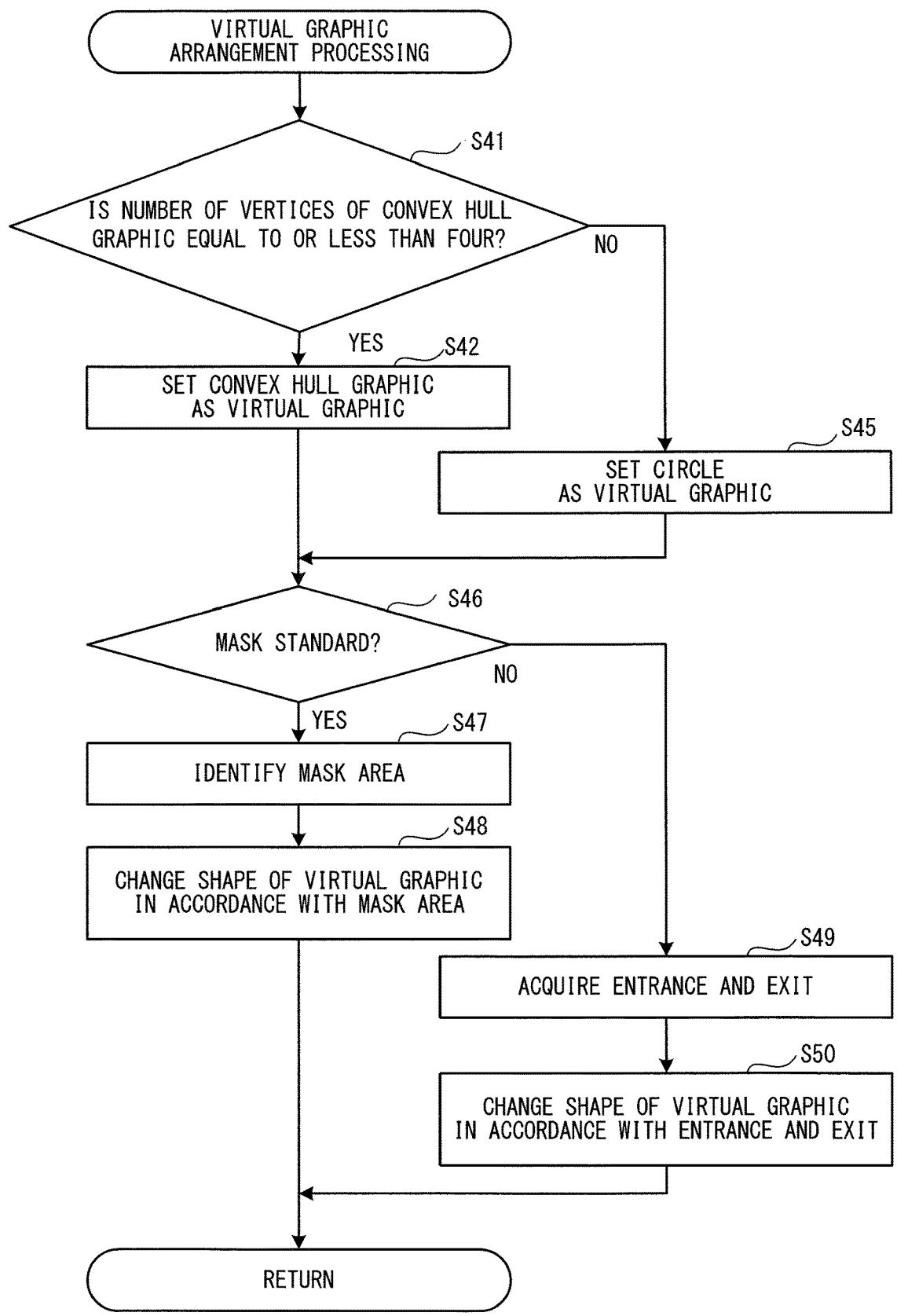
FIG. 5 is a flowchart of virtual graphic arrangement processing that is performed in the main processing shown in FIG. 2.

As shown in FIG. 5, in the virtual graphic arrangement processing, the CPU 1 determines whether the number of the vertices of the convex hull graphic represented by the convex hull data acquired at step S4 is equal to or less than 4 (step S41). When the convex hull graphic is a triangle or a quadrangle, it is determined that the number of the vertices of the convex hull graphic is equal to or less than 4 (yes at step S41), and the CPU 1 sets the convex hull graphic as the virtual graphic (step S42). Since the convex hull graphic of the first example is a quadrangle, the convex hull graphic 55 is set as the virtual graphic. When the number of the vertices of the convex hull graphic is not equal to or less than 4 (no at step S41), the CPU 1 sets a circle as the virtual graphic (step S45). Since the number of the vertices of the convex hull graphic 65 of the second example is not equal to or less than 4, a circle is set as the virtual graphic.

The CPU 1 determines whether to use a mask standard to set the arrangement of the virtual graphic with respect to the applique pattern (step S46). Using one of the mask standard and an entrance/exit standard, the CPU 1 of the present embodiment can set the arrangement of the virtual graphic with respect to the applique pattern. The mask standard is an arrangement method of the virtual graphic in which the virtual graphic is enlarged or reduced in accordance with the mask area of the applique pattern and the virtual graphic is arranged with respect to the applique pattern. The entrance/exit standard is an arrangement method of the virtual graphic in which the virtual graphic is arranged by being enlarged or reduced so that the applique pattern and the virtual graphic intersect with each other at the entrance and the exit of the concave portion. The arrangement method of the virtual graphic with respect to the applique pattern may be set by the user, or may be set automatically by the CPU 1 in accordance with the type, shape and size etc. of the embroidery pattern.

Figure 6:
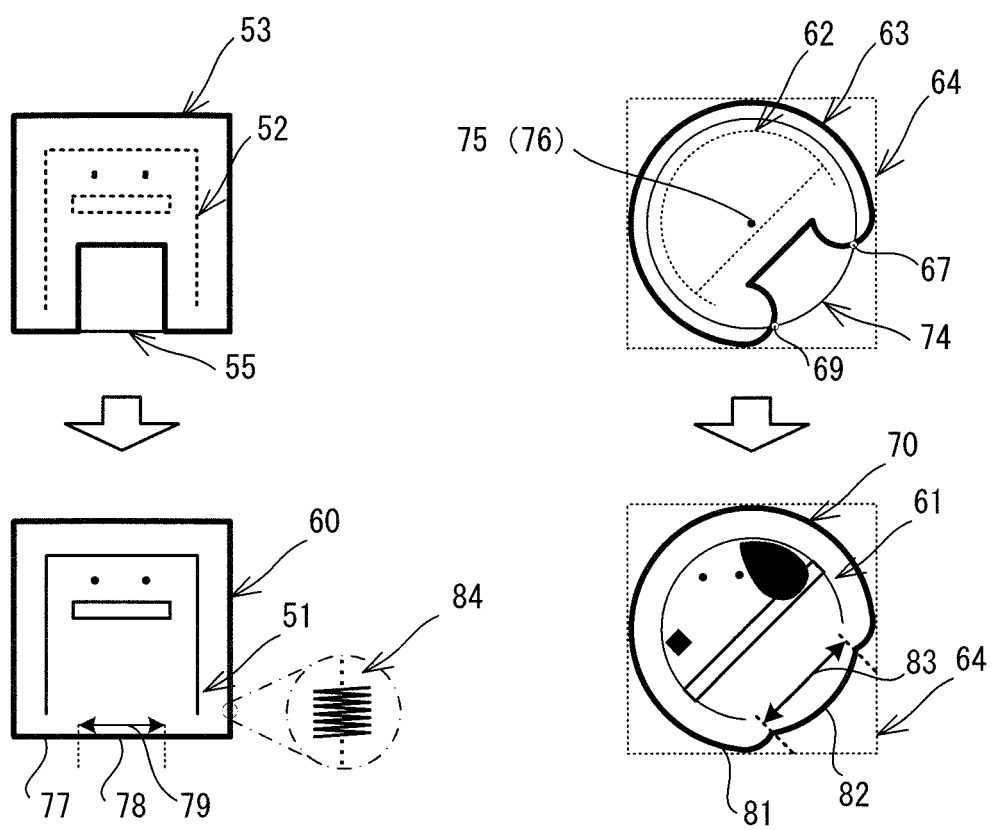
FIG. 6 is an explanatory diagram of a process in which the outline is set for each of the embroidery pattern of the first example and the embroidery pattern of the second example.

In the first example, when the mask standard is set as the arrangement method of the virtual graphic with respect to the applique pattern 53 (yes at step S46), the CPU 1 identifies the mask area 54 of the first example (step S47). In the first example, the mask area 54 having the same shape as the convex hull graphic 55 is identified. The CPU 1 changes the shape of the virtual graphic in accordance with the mask area identified at step S47, and arranges the virtual graphic with respect to the applique pattern (step S48). When the virtual graphic is a circle, the CPU 1 enlarges or reduces the virtual graphic in accordance with the mask area identified at step S47, and arranges the virtual graphic with respect to the applique pattern. The enlarging or reducing the virtual graphic in accordance with the mask area is, for example, enlarging or reducing the virtual graphic so as to be inscribed within the rectangular graphic representing the mask area. As shown in FIG. 6, in the first example, since the virtual graphic is the convex hull graphic 55, the arrangement of the virtual graphic with respect to the applique pattern 53 is maintained as the arrangement of the convex hull graphic 55 with respect to the applique pattern 53. The convex hull graphic 55 (the virtual graphic) forms a virtual line that is on the outside of the contour line 52 with respect to the embroidery pattern 51.

In the second example, when the entrance/exit standard is set as the arrangement method of the virtual graphic with respect to the applique pattern 63 (no at step S46), the CPU 1 acquires the entrance and the exit of the concave portion stored by the concave portion detection processing (step S49). In the second example, coordinates of the point 67 of the entrance and the point 69 of the exit of the concave portion are acquired (step S49). The CPU 1 changes the shape of the virtual graphic in accordance with the entrance and the exit of the concave portion acquired at step S49, and thus arranges the virtual graphic with respect to the applique pattern (step S50). Specifically, as shown in FIG. 6, the CPU 1 enlarges or reduces a virtual graphic 74 so that the applique pattern 63 and the virtual graphic 74 intersect with each other at the point 67 of the entrance and the point 69 of the exit. The CPU 1 of the present embodiment matches a center 75 of the mask area 64 of the applique pattern 63 with a center 76 of the virtual graphic 74. The virtual graphic 74 forms a virtual line that is on the outside of the contour line 62 with respect the embroidery pattern 61. When a plurality of concave portions are detected, the virtual graphic may be arranged for each of the concave portions, or a virtual graphic that is common to the plurality of concave portions may be arranged.

After the processing at step S48 or step S50, the CPU 1 ends the virtual graphic arrangement processing and returns the processing to the main processing in FIG. 2. After the processing at step S6, the CPU 1 sets the outline on the basis of the arrangement of the virtual graphic with respect to the applique pattern set at step S6 (step S7). As shown in FIG. 6, in the first example, an outline 60 is set. The outline 60 of the first example is a pattern that represents the convex hull graphic 55 using a line with a predetermined thickness. In the first example, a portion of the outline 60 that overlaps with the applique pattern 53 is an offset portion 77, and a portion that corresponds to arrows 79 and that does not overlap with the applique pattern 53 and overlaps with the virtual graphic (the convex hull graphic 55) is a complementary portion 78. The length of the offset portion 77 is longer than the length of the complementary portion 78. Although the outline 60 of the embroidery pattern 51 of the first example has a rectangular shape, the outline of the embroidery pattern 51 may have a shape such that four corners of the rectangle are chamfered in accordance with the first predetermined amount.

In the second example, an outline 70 is set. Of the outline 70, a portion that overlaps with the applique pattern 63 is an offset portion 81, and a portion that corresponds to arrows 83 and that does not overlap with the applique pattern 63 and overlaps with the virtual graphic 74 is a complementary portion 82. The length of the offset portion 81 is longer than the length of the complementary portion 82. The complementary portion 82 corresponds to a part of the virtual graphic 74 from the point 67 of the entrance to the point 69 of the exit in the clockwise direction. The offset portion 81 corresponds to a part of the applique pattern 63 from the point 69 of the exit to the point 67 of the entrance in the clockwise direction. The offset portion 81 and the complementary portion 82 are connected at the point 67 of the entrance and at the point 69 of the exit of the concave portion of the applique pattern 63 that corresponds to the contour of the embroidery pattern 61. More specifically, the complementary portion 82 is set at a position of the concave portion of the applique pattern 63.

The CPU 1 generates the sewing data to sew the outline set at step S7 (step S8). The sewing data represents positions (coordinates of the embroidery coordinate system) of the needle drop points of stitches of zigzag stitching, such as those shown by stitches 84. The sewing data may include thread color data that represents a thread color. The thread color may be set by the user or may be set automatically by the CPU 1 in accordance with the type of the embroidery pattern and the color etc. of the thread used for the embroidery pattern. The CPU 1 stores the generated sewing data of the outline in association with the pattern data of the embroidery pattern acquired at step S1. Then, the CPU 1 ends the main processing. The sewing data of the outline generated by the main processing is read by the sewing machine 10, via a storage medium, such as the communication I/F 5 or a memory card. In response to the command from the user, the sewing machine 10 performs processing to form the stitches that represent the embroidery pattern and the outline in accordance with the sewing data generated by the main processing.

The device 20 of the above-described embodiment can increase the possibility of successfully generating the outline that decreases a recess amount of the concave portion included in the contour of the embroidery pattern, in comparison to setting the outline that is offset from the contour of the embroidery pattern by a predetermined amount toward the outside of the embroidery pattern. In other words, the device 20 can reduce the possibility of generating the sewing data to sew the outline having a concave portion that is not intended by the user.

The CPU 1 of the present embodiment identifies the contour line of the embroidery pattern on the basis of the pattern data (step S2). The CPU 1 sets the virtual graphic as the virtual line that is on the outside of the contour line identified at step S2 (step S48 or step S50). The CPU 1 sets the outline having the offset portion that is offset from the contour line identified at step S2 toward the outside of the embroidery pattern by the first predetermined amount, and the complementary portion that is offset from the virtual line toward the outside of the embroidery pattern by the second predetermined amount (step S7). The virtual line of the present embodiment is represented by the virtual graphic, and the second predetermined amount of the present embodiment is 0. The device 20 can set the offset portion on the basis of the applique pattern that has been offset from the contour line toward the outside of the embroidery pattern by the first predetermined amount, and can set the complementary portion on the basis of the virtual graphic. The device 20 can perform the processing to set the outline more easily, in comparison to when the complementary portion is not set on the basis of the virtual line.

The CPU 1 sets the virtual graphic as the virtual line having a shape corresponding to the shape of the embroidery pattern (step S48, step S50). Specifically, the CPU 1 sets the virtual graphic in correspondence to the number of the vertices of the convex hull graphic, which represents the characteristics of the graphic represented by the contour line of the embroidery pattern (step S42 or step S45). The device 20 can increase the possibility of successfully setting the virtual line that is appropriate to the shape of the embroidery pattern. In other words, the device 20 can reduce the possibility of generating the sewing data to sew the outline having a shape that is not intended by the user.

As shown in the second example, when the arrangement of the virtual graphic is set using the entrance/exit standard (no at step S46), the CPU 1 sets the virtual line (the virtual graphic) having the shape that intersects with the graphic (the applique pattern) corresponding to the contour line of the embroidery pattern (step S50). The CPU 1 sets the outline by connecting the offset portion and the complementary portion at the positions corresponding to the intersection points of the graphic and the virtual line (step S7). The intersection points are the point of the entrance and the point of the exit of the concave portion detected by the concave portion detection processing. The device 20 can reliably set the virtual line on the outside of the contour line of the embroidery pattern (the outline pattern in the present embodiment) with respect to the embroidery pattern. More specifically, the device 20 can more reliably set the virtual line that decreases the recess amount of the concave portion included in the contour line of the embroidery pattern. The device 20 can increase the possibility of setting the virtual line that is appropriate to the shape of the embroidery pattern. The device 20 can reduce the possibility of generating the sewing data to sew the outline having a shape that is not intended by the user.

As shown in the first example, when the arrangement of the virtual graphic is set using the mask standard (yes at step S46), the CPU 1 identifies the size of the mask area that encompasses the embroidery pattern (step S47). The CPU 1 sets the virtual line representing the graphic having the size corresponding to the identified size of the mask area (step S48). The device 20 can set the virtual line representing the graphic having the size that is appropriate to the size of the embroidery pattern. In other words, the device 20 can reduce the possibility of generating the sewing data to sew the outline having a shape that is not intended by the user.

The CPU 1 detects the concave portion included in the graphic corresponding to the contour line (step S5). The graphic corresponding to the contour line of the present embodiment is the applique pattern. The CPU 1 sets the virtual graphic for the detected concave portion. The CPU 1 sets the virtual graphic as the virtual line that is on the outside of the detected concave portion with respect to the embroidery pattern (step S48 or step S50). Since the device 20 detects the concave portion using the convex hull data, the processing to detect the concave portion can be performed easily in comparison to when the convex hull data is not used. The CPU 1 of the present embodiment detects, as the concave portion, the portion for which the distance from the convex hull graphic is larger than the threshold value. When the distance from the convex hull graphic is equal to or less than the threshold value, the device 20 can generate the outline that is recessed in accordance with the recess. When the distance from the convex hull graphic is larger than the threshold value, the device 20 can generate the outline that is not recessed in accordance with the contour of the embroidery pattern and that reduces the recess amount, in comparison to when the outline is recessed in accordance with the contour of the embroidery pattern. The device 20 can reduce the possibility of generating the sewing data to sew the outline having a concave portion that is not intended by the user.

The CPU 1 sets the virtual line representing the graphic having the size corresponding to the size of the concave portion. Specifically, as shown in the second example, when the arrangement of the virtual graphic is set using the entrance/exit standard (no at step S46), the CPU 1 enlarges or reduces the virtual line (the virtual graphic) having the shape that intersects with the graphic (the applique pattern) corresponding to the contour line of the embroidery pattern, and arranges the virtual line (step S50). The device 20 can set the virtual line representing the graphic having the size that is appropriate to the size of the concave portion. The CPU 1 of the present embodiment, namely, the device 20 can reduce the possibility of generating the sewing data to sew the outline having a shape that is not intended by the user.

Figure 7:
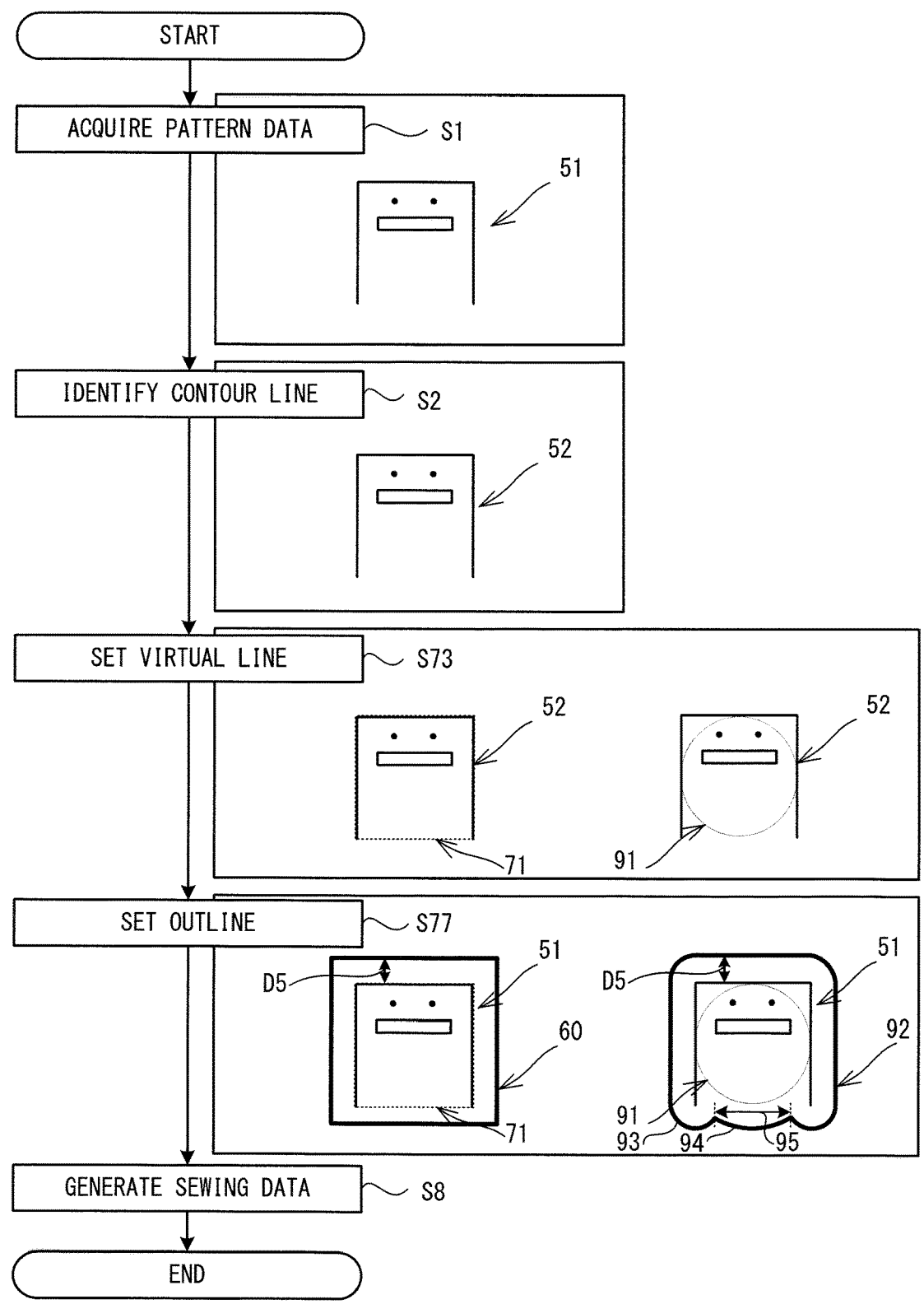
FIG. 7 is a flowchart of main processing according to a second embodiment.

Main processing according to the second embodiment will be explained with reference to FIG. 7. The same reference numeral is assigned to the same processing as that of the first embodiment. When the CPU 1 of the device 20 detects the same command as that of the first embodiment, the CPU 1 reads out, to the RAM 3, the sewing data generation program to perform the main processing stored in the program storage area of the ROM 2. In accordance with the instructions included in the sewing data generation program read out to the RAM 3, the CPU 1 performs the following steps. Various parameters that are necessary to perform the main processing are stored in the flash memory 4. Various data obtained in the course of the main processing are stored in the RAM 3, as appropriate. Hereinafter, as the first example, a case will be explained in which the embroidery pattern 51 stored in the flash memory 4 is selected as the pattern to be sewn.

The CPU 1 acquires the pattern data of the embroidery pattern 51 (step S1). The CPU 1 identifies the contour line 52 of the embroidery pattern 51 on the basis of the pattern data acquired at step S1 (step S2). The CPU 1 sets a virtual line for the contour line 52 on the basis of the pattern data acquired at step S1 (step S73). For example, the CPU 1 sets, as the virtual line, a convex hull graphic 71 represented by the convex hull data of the needle drop points representing the embroidery pattern 51. In another example, the CPU 1 sets, as the virtual line, a predetermined graphic that conforms to the size of the embroidery pattern 51. More specifically, the CPU 1 sets, as the virtual line, a circle 91 that is inscribed in the mask area representing the size of the embroidery pattern 51. The CPU 1 sets the outline by connecting an offset portion that is offset from the contour line 52 by a first predetermined amount toward the outside of the embroidery pattern, and a complementary portion that is offset from the virtual line by a second predetermined amount toward the outside of the embroidery pattern (step S77).

In the first example, for example, the CPU 1 sets, as the outline 60, a graphic that is offset from the convex hull graphic 71, which has been set as the virtual graphic at step S73, toward the outside of the embroidery pattern by a first predetermined amount D5. In the other example of the first example, the CPU 1 sets, as an outline 92, a graphic that is offset from sections the circle 91 set as the virtual graphic at step S73 and that are on the outside of the contour line 52, and from sections of the contour line 52 that are on the outside of the circle 91, toward the outside of the embroidery pattern 51 by the first predetermined amount D5. Of the outline 92, a portion that is offset from the contour line 52 toward the outside of the embroidery pattern 51 by the first predetermined amount D5 is an offset portion 93. Of the outline 92, a portion that corresponds to arrows 95 and that is offset from the circle 91 toward the outside of the embroidery pattern 51 by the first predetermined amount D5 is a complementary portion 94. The CPU 1 generates the sewing data to sew the stitches that represent the outline set at step S77 (step S8). Then, the CPU 1 ends the main processing.

According to the device 20 of the second embodiment, the device 20 can generate the sewing data to sew the outline that is less affected by the recess of the contour line 52, without detecting the concave portion of the graphic corresponding to the contour line 52 of the embroidery pattern 51. According to the device 20, it is possible to generate the sewing data to sew the outline, without generating the applique data as the graphic corresponding to the contour line 52.

The non-transitory computer-readable medium and the sewing data generation device of the present disclosure are not limited to the above described embodiment, and various changes may be made without departing from the spirit and scope of the present disclosure. For example, the following modifications (A) to (C) may be added as appropriate.

(A) The configuration of the device 20 may be changed as appropriate. The device 20 may be a dedicated device or may be a mobile terminal device, such as a smart phone, a tablet PC or the like. The device 20 may be provided in the sewing machine 10. As long as the sewing machine 10 is capable of embroidery sewing, it may be an industrial sewing machine or a multi-needle sewing machine.

(B) The program including the instructions to cause the main processing (refer to FIGS. 2 and 7), which is performed by the device 20, to be executed may be stored in a storage device of the device 20 until the CPU 1 executes the program. Therefore, an acquisition method of the program, an acquisition route, and the device that stores the program may each be changed as appropriate. The program to be executed by the CPU 1 may be received from another device via a cable or wireless communication, and may be stored in a storage device, such as a flash memory. Examples of the other device include a PC and a server connected via a network.

(C) The respective steps of the main processing (refer to FIGS. 2 and 7) performed by the device 20 are not limited to the example in which they are performed by the CPU 1, and a part or all of the steps may be performed by another electronic device (an ASIC, for example). The respective steps of the main processing may be performed through distributed processing by a plurality of electronic devices (a plurality of CPUs, for example). The respective steps of the main processing can be changed in order, omitted or added, as necessary. An aspect in which an operating system (OS) or the like operating on the device 20 performs a part or all of the main processing on the basis of a command from the CPU 1 is also included in the scope of the present disclosure. For example, the following modifications from (C-1) to (C-3) may be added to the main processing, as appropriate.

(C-1) The CPU 1 may set the outline without identifying the contour line of the embroidery pattern. For example, in the main processing of the second embodiment shown in FIG. 7, the CPU 1 may acquire the convex hull data of the needle drop points representing the embroidery pattern on the basis of the embroidery data of the embroidery pattern (step S1), may omit the processing at step S2, and may set, as the virtual graphic, the convex hull graphic represented by the convex hull data of the embroidery pattern (step S73). The CPU 1 may set, as the outline, a graphic that is offset from the convex hull graphic toward the outside of the embroidery pattern by a predetermined amount (step S77). The CPU 1 may set the outline without setting the virtual line on the outside of the contour line with respect to the embroidery pattern. When setting the offset portion that is offset from the contour line toward the outside of the embroidery pattern by the first predetermined amount and setting the complementary portion that is offset from the virtual line toward the outside of the embroidery pattern by the second predetermined amount, the first predetermined amount and the second predetermined may be the same value or may be different values.

(C-2) The CPU 1 need not necessarily set the virtual line having a shape that corresponds to the shape of the embroidery pattern. For example, a graphic having a predetermined shape (a circle, for example) may be set as the virtual line, irrespective of the shape of the embroidery pattern. The CPU 1 need not necessarily set the virtual line having the shape that intersects with the graphic corresponding to the contour line of the embroidery pattern. The graphic corresponding to the contour line may be a graphic that is represented by the contour line itself, or may be a graphic that has a similarity to the graphic represented by the contour line itself. Further, the graphic corresponding to the contour line may be a graphic, such as the applique pattern of the first embodiment, that has concave-convex portions corresponding to the concave-convex portions included in the contour line. The virtual line may be a polygon or a circular line, such as a circle, or may be a line segment or a line having a start point and an end point, such as an arc. For example, the virtual line may be a line segment connecting the entrance and the exit of the concave portion detected by the concave portion detection processing. The CPU 1 need not necessarily set the outline by connecting the offset portion and the complementary portion at the positions corresponding to the intersection points of the graphic corresponding to the contour line and the virtual line. In the virtual graphic arrangement processing in FIG. 5, the arrangement of the virtual graphic (the virtual line) with respect to the graphic corresponding to the contour line may be set using one of the mask standard and the entrance/exit standard.

(C-3) The CPU 1 need not necessarily identify the size of the mask area that encompasses the embroidery pattern. The CPU 1 need not necessarily set the virtual line representing the graphic having the size corresponding to the size of the mask area. The CPU 1 need not necessarily detect the concave portion included in the graphic corresponding to the contour line, on the basis of the contour line, as in the main processing of the second embodiment. When the CPU 1 detects the concave portion of the graphic corresponding to the contour line, the CPU 1 may use a known method that does not use the convex hull data. The CPU 1 need not necessarily set the virtual line corresponding to the detected concave portion. The CPU 1 need not necessarily set the virtual line that represents the graphic having the size corresponding to the size of the concave portion.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed, instruct a processor of a sewing data generation device to perform processes comprising:

acquiring pattern data to sew an embroidery pattern;

setting an outline having an offset portion and a complementary portion based on the pattern data, the outline being a single line surrounding an outside of a contour of the embroidery pattern, the offset portion being a part of the single line and being offset from the contour toward the outside of the embroidery pattern by a predetermined amount, and the complementary portion being another part of the single line and being offset from the contour toward the outside of the embroidery pattern by an amount larger than the predetermined amount, the setting of the outline including:
- identifying a contour line of the embroidery pattern based on the pattern data,
- setting a virtual line on an outside of the contour line with respect to the embroidery pattern, and
- setting the outline having the offset portion that is offset from the contour line toward the outside of the embroidery pattern by the predetermined amount, and the complementary portion that is set based on the virtual line; and
- generating sewing data to sew the outline.

2. The non-transitory computer-readable medium according to claim 1, wherein the setting of the virtual line includes setting the virtual line having a shape corresponding to a shape of the embroidery pattern.

3. The non-transitory computer-readable medium according to claim 2, wherein the setting of the virtual line includes setting the virtual line having one of a circular shape or an arc shape.

4. The non-transitory computer-readable medium according to claim 1, wherein:
- the setting of the virtual line includes setting the virtual line having a shape that intersects with a graphic corresponding to the contour line of the embroidery pattern, and
- the setting of the outline includes setting the outline by connecting the offset portion and the complementary portion at positions corresponding to intersection points of the graphic and the virtual line.

5. The non-transitory computer-readable medium according to claim 1, wherein:
- the computer-readable instructions further instruct the processor to perform a process comprising identifying a size of a mask area that encompasses the embroidery pattern, and
- the setting of the virtual line includes setting the virtual line representing a graphic, the graphic having a size corresponding to the size of the mask area.

6. The non-transitory computer-readable medium according to claim 1, wherein:
- the computer-readable instructions further instruct the processor to perform a process comprising detecting a concave portion included in a graphic corresponding to the contour line, and
- the setting of the virtual line includes setting the virtual line for the detected concave portion.

7. The non-transitory computer-readable medium according to claim 6, wherein the setting of the virtual line includes setting the virtual line representing a virtual graphic, the virtual graphic having a size corresponding to a size of the concave portion.

8. The non-transitory computer-readable medium according to claim 1, wherein the setting of the outline includes:
- identifying a convex hull graphic represented by a convex hull of an offset pattern, the offset pattern being offset from the contour of the embroidery pattern toward the outside of the embroidery pattern by the predetermined amount, and
- setting, as the offset portion, a portion of the convex hull graphic that overlaps with the offset pattern, and setting, as the complementary portion, a portion of the convex hull graphic that does not overlap with the offset pattern.

9. The non-transitory computer-readable medium according to claim 1, wherein:
- the computer-readable instructions further instruct the processor to perform a process comprising detecting a concave portion included in a graphic corresponding to the contour line, and
- the setting of the outline includes setting the complementary portion at a position of the detected concave portion.

10. A sewing data generation device comprising:
- a processor;
- a memory configured to store computer-readable instructions that, when executed by the processor, instruct the processor to perform processes comprising:
  - acquiring pattern data to sew an embroidery pattern;
  - setting an outline having an offset portion and a complementary portion based on the pattern data, the outline being a single line surrounding an outside of a contour of the embroidery pattern, the offset portion being a part of the single line and being offset from the contour toward an outside of the embroidery pattern by a predetermined amount, and the complementary portion being another part of the single line and being offset from the contour toward the outside of the embroidery pattern by an amount larger than the predetermined amount, the setting of the outline including:
    - identifying a contour line of the embroidery pattern based on the pattern data,
    - setting a virtual line on an outside of the contour line with respect to the embroidery pattern, and
    - setting the outline having the offset portion that is offset from the contour line toward the outside of the embroidery pattern by the predetermined amount, and the complementary portion that is set based on the virtual line; and
  - generating sewing data to sew the outline.

11. The sewing data generation device according to claim 10, wherein the setting of the virtual line includes setting the virtual line having a shape corresponding to a shape of the embroidery pattern.

12. The sewing data generation device according to claim 11, wherein the setting of the virtual line includes setting the virtual line having one of a circular shape or an arc shape.

13. The sewing data generation device according to claim 10, wherein:
- the setting of the virtual line includes setting the virtual line having a shape that intersects with a graphic corresponding to the contour line of the embroidery pattern, and
- the setting of the outline includes setting the outline by connecting the offset portion and the complementary portion at positions corresponding to intersection points of the graphic and the virtual line.

14. The sewing data generation device according to claim 10, wherein:
- the computer-readable instructions further instruct the processor to perform a process comprising identifying a size of a mask area that encompasses the embroidery pattern, and
- the setting of the virtual line includes setting the virtual line representing a graphic, the graphic having a size corresponding to the size of the mask area.

15. The sewing data generation device according to claim 10, wherein:
   the computer-readable instructions further instruct the processor to perform a process comprising detecting a concave portion included in a graphic corresponding to the contour line, and
   the setting of the virtual line includes setting the virtual line for the detected concave portion.

16. The sewing data generation device according to claim 15, wherein the setting of the virtual line includes setting the virtual line representing a virtual graphic, the virtual having a size corresponding to a size of the concave portion.

17. The sewing data generation device according to claim 10, wherein the setting of the outline includes:
   identifying a convex hull graphic represented by a convex hull of an offset pattern, the offset pattern being offset from the contour of the embroidery pattern toward the outside of the embroidery pattern by the predetermined amount, and
   setting, as the offset portion, a portion of the convex hull graphic that overlaps with the offset pattern, and setting, as the complementary portion, a portion of the convex hull graphic that does not overlap with the offset pattern.

18. The sewing data generation device according to claim 10, wherein:
   the computer-readable instructions further instruct the processor to perform a process comprising detecting a concave portion included in a graphic corresponding to the contour line, and
   the setting of the outline includes setting the complementary portion at a position of the detected concave portion.

19. A non-transitory computer-readable medium storing computer-readable instructions that, when executed, instruct a processor of a sewing data generation device to perform processes comprising:
   acquiring pattern data to sew an embroidery pattern;
   setting an outline having an offset portion and a complementary portion based on the pattern data, the outline being a single line surrounding an outside of a contour of the embroidery pattern, the offset portion being a part of the single line and being offset from the contour toward an outside of the embroidery pattern by a predetermined amount, and the complementary portion being another part of the single line and being offset from the contour toward the outside of the embroidery pattern by an amount larger than the predetermined amount;
   detecting a concave portion included in a graphic corresponding to the contour, the setting of the outline including setting the complementary portion at a position of the detected concave portion; and
   generating sewing data to sew the outline.

* * * * *